United States Patent Office 3,342,654
Patented Sept. 19, 1967

3,342,654
PROCESS FOR PRODUCING WOUND CAPACITORS HAVING A BIAXIALLY ORIENTED, THERMOPLASTIC, DIELECTRIC MEDIUM BETWEEN ALTERNATE ELECTRODES
Edward J. Golonka, Hillside, and John B. O'Brien, Westchester, Ill., assignors to Western Electric Company, Incorporated, New York, N.Y., a corporation of New York
Filed Feb. 21, 1964, Ser. No. 346,423
9 Claims. (Cl. 156—85)

ABSTRACT OF THE DISCLOSURE

Capacitors having a biaxially oriented, thermoplastic dielectric medium, such as polystyrene, are produced by winding alternate layers of the dielectric material and an electrode material into a capacitor body, with the initial capacitance value thereof bearing a relationship to the final desired capacitance value predicated upon a predetermined classification group into which the dielectric material falls. Identity of a particular roll of dielectric material with a specific group is dependent on a correlation between the initially measured thickness and relieving force characteristics of a sample piece of the material. Subsequent heat treating of the capacitor results in the shrinking of the biaxially oriented dielectric material into an intimate physical bonding relationship with the electrode material and the attainment of a capacitor having the desired capacitance value.

This invention relates to a process for producing capacitors having a biaxially oriented, thermoplastic, dielectric medium between alternate electrodes, and more particularly to a rocess for producing capacitors wherein wound layers of biaxially oriented, thermoplastic material are heat treated to shrink them into an intimate physical bonding relationship with alternate layers of an electrode material thereby to form a capacitor of desired final capacitance value. It is an object of this invention to provide an improved process of such character.

Thin continuous sheets of biaxially oriented, thermoplastic, dielectric material are produced commercially by extrusion processes of the type described, for example, in U.S. Patent 3,090,991 issued to C. T. Hathaway on May 28, 1963. Longitudinal and lateral stressing forces applied to the heated sheet during the extrusion process cause a resultant semipermanent deformation and stressing of the extruded sheet along its longitudinal and lateral axes. The stresses induced into the sheet of material are locked into the sheet by a quenching process which cools the stressed sheet rapidly from the extrusion temperature to a temperature below which the biaxially oriented, thermoplastic material is not sufficiently mobile to return to its unstressed state. Sheets of stressed thermoplastic material, intended for use as a dielectric medium in the production of capacitors, are conventionally slit into a plurality of ribbon-like webs with each web being wound into an individual roll.

As is well known in the art, alternate layers of an electrode material and a dielectric material, for example, biaxially oriented polystyrene, are wound tightly together to produce cylindrical capacitor bodies. Subsequent heat treatment of these capacitor bodies to a temperature above which the stresses in the polystyrene are relieved permits a shrinking of the polystyrene to dimensions approaching its non-stressed state. During the shrinking process, the polystyrene dielectric web adheres to the electrode material and an intimate physical bonding occurs therebetween such that the capacitor body becomes electrically stable when it is in an operational state.

In producing polystyrene capacitors, or any capacitors wherein a biaxially oriented, thermoplastic dielectric medium is utilized, varied capacitance levels may be achieved by winding variable lengths of polystyrene material and electrode material into the initial capacitor bodies. However, during the heat treating operation, the initial capacitance value of each individual capacitor body is subject to an initial decrease of capacitance, followed thereafter by both an increase and then a decrease of capacitance. As a general rule, the rate of change of capacitance of the capacitor body is first a function of the temperature coefficient of the capacitor and then a positive and then a negative function of the rate of shrinkage of the biaxially oriented polystyrene material. A mathematical model for correlating these various rates of change has never been developed due to the many variable factors which are encountered in this process.

Thus, the process of making polystyrene capacitors of a desired final capacitance value has been one which is considered to be an art rather than a science. The initial capacitance value to which a capacitor was wound in order to produce a capacitor of desired final value was largely a discretionary matter and subject to change because of conditions evaluated by the person controlling the process. Using a process in this manner resulted in production of a significant number of capacitors which did not have the final capacitance value desired.

It is, therefore, an object of this invention to provide a process for producing capacitors which have a biaxially oriented, thermoplastic, dielectric medium wherein the produced capacitors have a desired final capacitance value.

It is another object of this invention to provide a process wherein heat treatment of a polystyrene capacitor of an initial capacitance value results in a capacitor having a predictable final capacitance value.

It is still another object of this invention to provide a process for producing a polystyrene capacitor of a desired final capacitance value by initially winding the capacitor to a capacitance value having a determined relationship with measurable characteristics of the polystyrene material.

It is a further object of this invention to provide a process for producing polystyrene capacitors of a desired final capacitance value which is applicable to all capacitance ranges of polystyrene capacitors.

It is a still further object of this invention to provide a process for producing polystyrene capacitors of precise capacitance value which is relatively simple, efficient in operation, and economical to utilize.

In accordance with the invention, homogeneous rolls of a biaxially oriented, thermoplastic, dielectric material such as polystyrene are classified into individual ones of a plurality of classification groups. The particular group into which an individual roll falls is determined by measuring the thickness and the relieving force characteristics of a sample piece of the web. Alternate layers of classified material and electrode material are wound subsequently into a capacitor body which has a predetermined initial capacitance value. The initial capacitance value to which the capacitor is wound has a relationship with the final capacitance value desired based upon the classification group into which the material falls.

Subsequent heat treatment of the capacitor, wound to the initial preselected value, results in the shrinkage of the biaxially oriented material into an intimate physical bonding relationship with the electrode material and the production of a capacitor having the desired capacitance value. By initially classifying the dielectric material and by winding the capacitor to an initial preselected capacitance value, a capacitor of desired final value is produced by controlled heat treating methods. During the controlled heat treatment, the capacitance reaches a predetermined percentage of the desired final value after a major proportion, but not all, of the shrinking of the dielectric material has occurred. Termination of the heat treatment during this controlled portion of the shrinkage allows the subsequent development of the desired final capacitance and production of an electrically stable capacitor. In order for such a capacitor to be electrically stable a major proportion of the shrinkage must occur. The difficulty encountered with prior processes is in part explained by the lack of this precise control factor as there was no assurance in the prior processes that the capacitance would reach the predetermined percentage of the desired final value after a major proportion, but not all, of the shrinking of the dielectric material had occurred.

Although the heat treating operation may be carried out over a preselected number of hours, preferably the heat treating cycle is controlled and is terminated when the capacitance of the capacitor has reached the predetermined percentage of the desired final capacitance. The final capacitance of the capacitor then develops during a cooling operation following termination of the heat treating cycle.

This invention together with further objects and advantages thereof will best be understood by reference to the following description taken in connection with the accompanying drawings, in which.

*Winding capacitors to an initial capacitance value*

Figure 1:
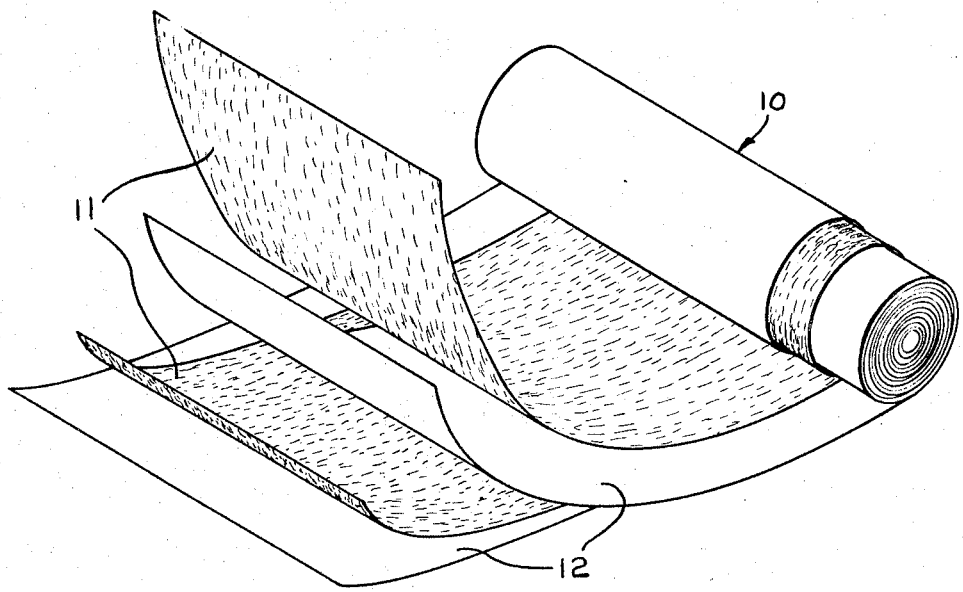
FIG. 1 is a pictorial representation of a partially wound polystyrene capacitor.

In FIG. 1 a wound capacitor 10 is illustrated which includes alternate layers of a biaxially oriented, thermoplastic, dielectric material 11 between facing layers of electrode material 12, the latter extending in opposite directions beyond the dielectric material. The capacitor is wound by any of the methods known in the art and may be terminated by the method described in a co-pending application of R. F. Kalina, Serial No. 265,110, filed March 14, 1963, now Patent No. 3,237,274 issued March 1, 1966.

While many suitable biaxially oriented, thermoplastic materials may be utilized for the dielectric material 11, the detailed description herein is based upon the use of polystyrene material as the dielectric. Polystyrene has many advantageous characteristics over other known biaxially oriented, thermoplastic materials and, therefore, is extensively utilized in production of capacitors. However, as will be apparent to those skilled in the art, other biaxially oriented, thermoplastic materials may be successfully utilized in producing capacitors of a desired final capacitance value by the process disclosed herein. Although the electrode material 12 may be one of many well known metals or alloys, it is preferably a solder alloy composition containing 40 to 90% tin, 58 to 8% lead, and 2% antimony or other ingredients.

In initiating the process, a short length of material is severed from each individual roll of polystyrene material. While various rolls of material have different physical characteristics, each individual roll of material is substantially homogeneous throughout its own length as far as its physical characteristics are concerned. The physical characteristics vary from roll to roll because the rolls are severed from various positions along a sheet of extruded polystyrene, and because the extruded sheet of polystyrene is produced on various process machinery.

The severed portion of polystyrene material is measured by any suitable means to determine its thickness. In further discussion of the process, it will be assumed that each roll of polystyrene has a nominal thickness of .5 mils ($50 \times 10^{-5}$ inches). The actual thickness of rolls having a nominal thickness of .5 mils is commonly between .34 mils to .66 mils.

A second measurement is made on the material severed from each individual roll to determine the relieving force of the biaxially oriented, polystyrene material. Relieving force is a measure of the amount of force exerted by the sheet when the sheet is heated to a temperature sufficient to allow the biaxially oriented film to contract and return to an unstressed condition. Methods of measuring relieving force are set forth in ASTM designation: D1504–57T and in a paper on "Measurement of Orientation in Polystyrene Film and Sheet" by C. T. Hathaway as published in Technical Papers, volume VII, presented at Seventeenth Annual Technical Conference of the Society of Plastic Engineers, Incorporated, Washington, D.C., January 1961.

Figure 2:
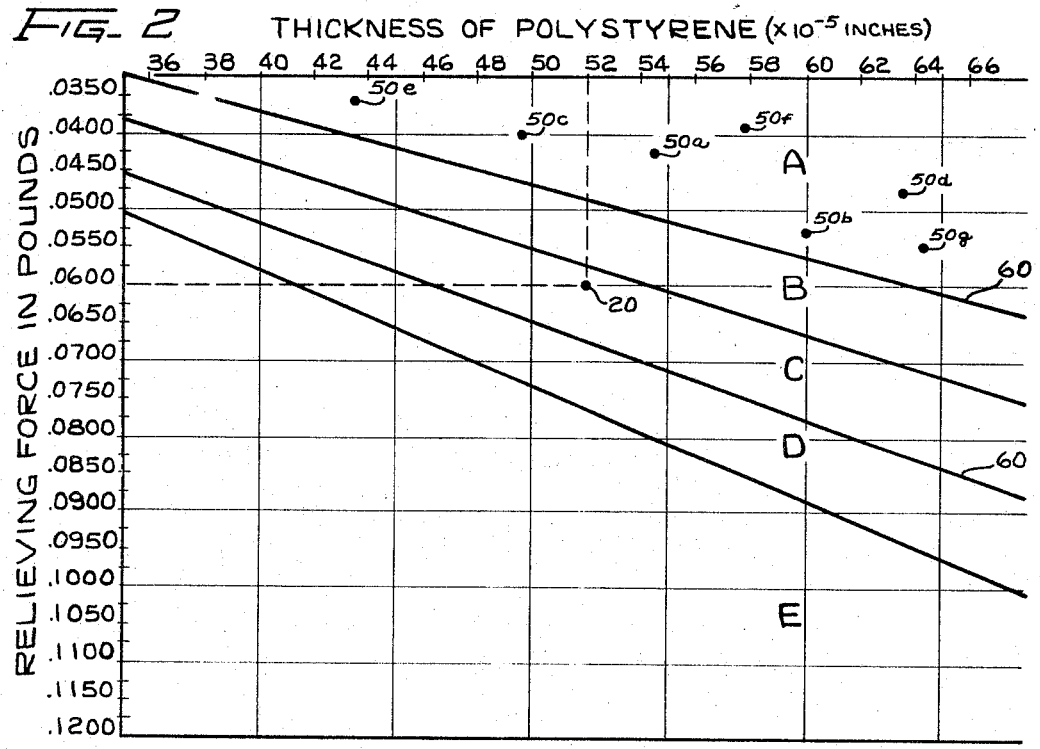
FIG. 2 is a graph showing classifications for biaxially oriented, thermoplastic polystyrene material in accordance with measured thickness and relieving force characteristics of the polystyrene material.

After the thickness and relieving force characteristics of a severed length of polystyrene material are measured, a graph similar to that depicted in FIG. 2 is utilized to determine the classification group into which the individual roll of material falls. The development of graphs for determination of classification groups for various nominal thicknesses of polystyrene material is discussed in greater detail in a subsequent section of the specification. The graph depicted in FIG. 2 has been developed for use in producing capacitors wherein the capacitance values varies from .01 mf. to .10 mf. and wherein the polystyrene dielectric has a nominal thickness of .5 mils. In the graph of FIG. 2, five separate classification levels, lettered A through E, are established. The proper classification level of a roll of polystyrene is determined by locating the intersection of the abscissa value of the measured thickness of the material and the ordinate value of the relieving force of the material.

For the sake of further illustration, it will be assumed that the severed length of material from a particular roll had a thickness of $52 \times 10^{-5}$ inches and a relieving force of 0.0600 pounds. The intercept of the abscissa and ordinate for material having such characteristics falls at point 20 on FIG. 2 and the proper classification group is C.

For further illustration, it also is assumed that the individual roll of material is to be utilized in making polystyrene capacitors having a final capacitance value of 0.02 mf. To determine the initial capacitance value to which lengths of polystyrene material taken from the classified roll and electrode material must be wound in order to produce a 0.02 mf. capacitor, the semilog graph depicted in FIG. 3 must be consulted.

Figure 3:
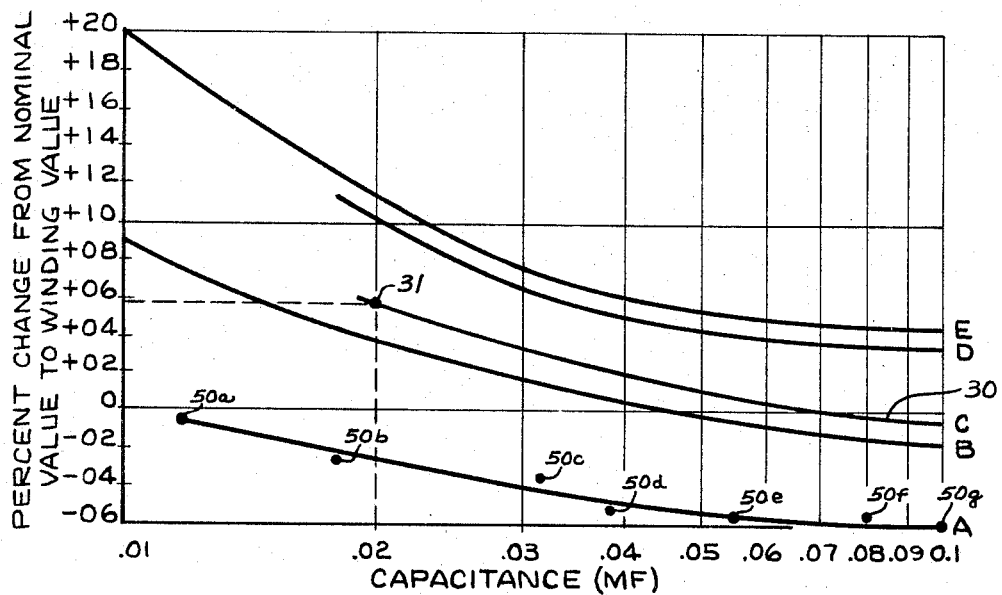
FIG. 3 is a graph utilized in determining the initial capacitance level to which a polystyrene capacitor containing classified polystyrene material must be wound in order to produce a capacitor of desired final value.

The graph of FIG. 3 is utilized solely in the production of polystyrene capacitors having both final capacitance values ranging from .01 mf. to 0.1 mf. and polystyrene dielectric material of .5 mil nominal thickness. The development of graphs such as the one depicted in FIG. 3 for other nominal thickness values of polystyrene material and for other capacitance ranges of capacitors, is discussed in a subsequent section of the specification.

For the hypothetical example assumed above, the curve 30 of FIG. 3, corresponding to the C classification of material, is used in determining the initial capacitance value which will result in the desired final value after proper heat treatment. The intercept 31 of the curve 30 and the abscissa value of 0.02 mf. is utilized to obtain an ordinate value reading as to the percentage change from the nominal value of the winding value. In this case the ordinate of the graph in FIG. 3 shows that to produce a capacitor having a final capacitance value of 0.02 mf., from C classification material, the initial capacitance value must be 5.8% above the desired final value. Therefore, to produce a 0.02 mf. capacitor from C classification material, the initial capacitance level must be 5.8% above 0.02 mf. or 0.02116 mf.

Heat treatment cycles

A heat treating operation must be carried out on the initially wound capacitor having a value of 0.02116 mf. in order to produce a capacitor having a final capacitance value of 0.02000 mf. While several heat treating cycles may be used alternatively in developing the final capacitance of the capacitor, the graphs shown in FIGS. 2 and 3 have been developed for a variable length heat treat cycle. This particular heating cycle is discussed first, followed by a discussion of the alternative heating cycle. In a subsequent section of the specification, the manner of developing charts of the nature disclosed in FIGS. 2 and 3 is described for the various heat treating cycles. Regardless of the particular heat treatment utilized, the initial classification of the polystyrene and the winding of the capacitor to a predetermined initial value insures that the capacitance will pass through the termination value at some time after the major proportion, but not all, of the shrinking of the polystyrene has occurred.

Figure 4:
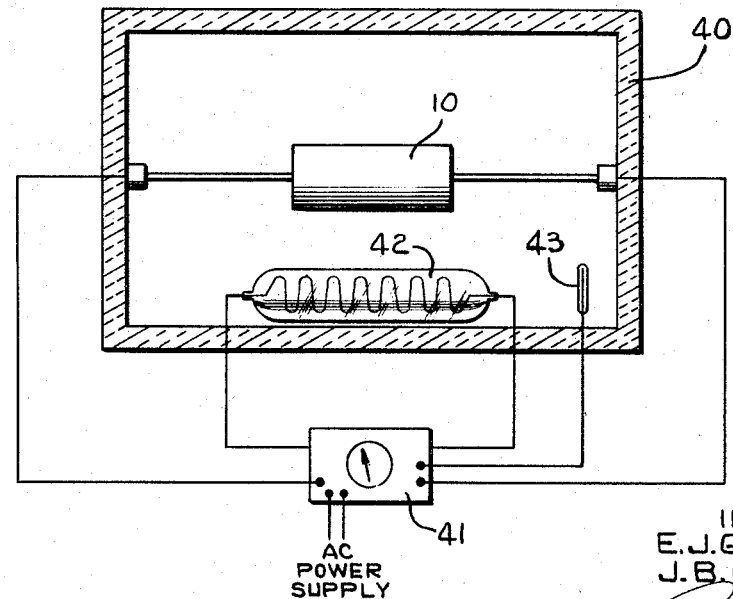
FIG. 4 is a schematic representation of heat treating equipment which may be utilized to practice the process of this invention.

In FIG. 4, the wound capacitor 10 is shown enclosed in a heat treating furnace 40. Also depicted in FIG. 4 is a capacitor monitoring and heat control unit 41, which may be of any well known design. Leads connect the capacitor 10 to the unit 41, as shown, such that the unit may monitor the capacitance of the capacitor during the heat treating cycle. The unit 41 is connected to and provides power for a standard heating element 42. A thermocouple 43 is located within the furnace and is connected to the unit 41 such that the unit may receive an indication of the furnace temperature.

When the capacitor 10 is placed initially in the furnace 40, the furnace is at room temperature. Through cam controlled heating programs of a standard type, the control unit supplies power to the heating element 42 to raise the temperature of the furnace linearly from room temperature to 219° F. over a two hour period. From room temperature to 170° F. the capacitor 10 experiences a decrease in capacitance as both the electrode material and polystyrene web expand. This initial decrease of capacitance is a function of the temperature coefficient of capacitance of the wound capacitor and is not associated in any way with a shrinking of the polystyrene material. From the temperature of 170° F. to the predetermined temperature of 219° F. the capacitance of the capacitor increases slightly as the biaxially oriented, polystyrene material starts to contract. The rate of shrinkage of the dielectric web is substantially immaterial below a temperature of approximately 205° F. and is generally considered as being zero shrinkage.

After the furnace 40 has reached the predetermined temperature of 219° F., the control unit 41 holds the furnace at this temperature for at least one hour. During this one hour period a major proportion of the shrinking of the polystyrene material into an intimate physical bonding relationship with the electrode material will occur. While the actual percentage of shrinkage depends upon the capacitance value of the capacitor and the nominal thickness of the polystyrene material, approximately 90% of the total shrinkage experienced by the polystyrene during the heating process is accomplished during this one hour of heat treatment at the predetermined temperature of 219° F. Also, during this one hour period, the capacitance value of the capacitor reaches and then descends from its highest capacitance value.

When a capacitor utilizing a polystyrene dielectric is cooled from 219° F. to room temperature, the capacitance value increases 1.25%. As previously pointed out, by winding the capacitor to an initial capacitance value determined by utilization of the graphs of FIGS. 2 and 3, one is assured that the capacitance value of the capacitor will pass through the value 1.25% below the desired final capacitance value sometime after the first hour of heat treatment, during which a major proportion of shrinking has occurred, and before a total of four hours of heat treatment, during which the remaining proportion of shrinking will occur. While the capacitor is heat treated for the variable time between the first and fourth hour at the temperature of 219° F., the rate of shrinkage of the polystyrene material is relatively slow and the material is, in effect, being adequately cured. However, the shrink rate is of sufficient magnitude to cause a steady, although slight, decrease in the capacitance of the capacitor. Thus, as the capacitance of the capacitor decreases, it passes through the point 1.25% below the desired final value at sometime during the control period of the first to fourth hour of heat treatment at 219° F.

When the capacitor achieves the capacitance value 1.25% below that desired, the control unit 41 momentarily terminates the power input to the heating element 42 such that the capacitor body is quenched from a temperature of 210° F. to 205° F. The quenching may also be effected by directing a jet of cool gas into the furnace 40. When the furnace is cooled to a temperature of 204° F., the shrinkage of the polystyrene dielectric is terminated for all practical purposes. Also, when the furnace is cooled to 204° F., the control unit again assumes control of the furnace temperature such that the capacitor is cooled at a linear rate from 204° F. to room temperature during a two hour time period.

Since the effective portion of the heat treating cycle is terminated when the capacitance of the capacitor passes through a value 1.25% below that desired, the cooling operation allows a 1.25% gain in the capacitance of the capacitor such that the final capacitor produced has substantially the exact desired final capacitance.

While the heat treating process has been described as being embodied in a heating cycle which is terminable anywhere between the first and fourth hour of the heating at 219° F., alternate heat treating methods are available. The alternate heat treating methods are identical to the vairable termination heat treating method during the initial rise of temperature from room temperature to 219° F. and for the first hour at 219° F. After this initial period of heat treatment, the alternate methods utilize heating cycles which are terminated at a selected time beyond the third hour, for example, the fourth, fifth or sixth hour of heat treatment.

By utilization of the methods of this invention termination of the heat treating cycle is effected at a selected time interval, capacitors having a capacitance value within 0 to 1.5% of the desired final capacitance value are produced. As long as the capacitors are wound to an initial value, which is determined by the classification group into which the polystyrene material is initially classified and the capacitance value desired in the final capacitor, the resulting capacitor has a final capacitance value within 0 to 1.5% of that desired.

In the alternate heat treating methods, the terminal portion of the method is preferably the same as that previously described above in that the capacitor is quenched from 219° F. to 204° F. before the cooling from 204° F. to room temperature over a two hour time interval.

Preparation of graphs

The graphs depicted in FIGS. 2 and 3 are prepared as a unit after particular decisions have been made as to (1) the nominal thickness of the biaxially oriented, thermoplastic material which is to be utilized as the dielectric medium in the capacitors, (2) the capacitance values of the capacitors which are to be produced, and (3) the particular heat treatment cycle which is to be utilized in the production of the capacitors. For the purpose of illustration it will be assumed that capacitors having capacitance values between 0.01 mf. and 0.10 mf. are to be produced using polystyrene material having a .5 mil nominal thickness by utilization of a heat treatment process which is to be terminated one hour after the capacitor has been held at the predetermined temperature for the initial one hour period. Termination of the heat treatment at this point insures that a major proportion of the shrinking of the polystyrene has occurred and that the resulting capacitor is electrically stable.

The first step in the procedure for preparing the graphs is to produce a number of test capacitors having various initial capacitance levels ranging from 0.01 mf. to 0.1 mf. While the number of test capacitors needed is a variable, the production of 200 test capacitors is sufficient to establish initially graphs of the type depicted in FIGS. 2 and 3. The dielectric, polystyrene material for each test capacitor is taken from a different roll of polystyrene. Before winding each capacitor, both the thickness and the relieving force characteristics of the polystyrene material utilized in that capacitor are ascertained. Each wound capacitor is made individually identifiable as each capacitor has a particular dielectric thickness, dielectric relieving force, characteristic, and an initial capacitance value.

In the second step, all of the test capacitors are heat treated in accordance with a predetermined cycle. In this illustration, the heat treating cycle is one in which the capacitors are held at the predetermined temperature of 219° F. for one additional hour beyond the initial one hour period at 219° F. After termination of the heat treating cycle and the cooling of the capacitors to room temperature, the final capacitance value of each test capacitor is determined.

In the third step to set up the graphs, the semi-log graph of FIG. 3 is established by plotting the final capacitance value of each of the plurality of test capacitors against the percentage change in capacitance value experienced by the test capacitor between its initial, winding value and its final, nominal value. When the data obtained for all the test capacitors has been plotted in this manner, various, easily identified trends will be noticed. For example, in FIG. 3, points 50a–50g would show one particular trend through which a curve A may be drawn by any of the various curve fitting methods. In the development of any particular graph of the nature of FIG. 3, several trends may be noticed and as shown in FIG. 3, five individual curves have been fitted to show five individual trends labeled A through E. The curve A is the curve which best fits the various points 50.

Having established that the seven points 50a–50g in FIG. 3 are all within the trend of the curve labeled A, the graph depicted in FIG. 2 may now be developed. When the thickness and relieving force characteristic of the individual capacitors identified by the points 50a–50g in FIG. 3 are plotted in FIG. 2, a definite zone of A classification material is located. Similarly, points utilized in establishing the curves B, C, D and E will locate other zones of classified material. Zone boundary lines 60 are drawn in FIG. 2 to separate the various zones of material but the initially drawn zone boundary lines are arbitrary and are subject to slight modifications as more data is obtained. However, as more capacitors are produced, the data for the larger number of capacitors is recorrelated and the zone boundary lines are established more definitely. Definite establishment of the zone boundary lines can be made when a total of 500 capacitors have been subjected to the heat treating cycle. In actuality, production of 500 capacitors occurs in a relatively short time as economical manufacture calls for a weekly production numbered in thousands of capacitors.

Thus, in a relatively easy manner, graphs similar to those depicted in FIGS. 2 and 3 may be developed for any heat treatment cycle, nominal thickness of polystyrene material, and various capacitance ranges of capacitors. If a two or three hour additional heat treatment cycle is utilized, the charts are developed in exactly the same manner with the single exception that the desired heat treatment cycle is utilized instead of the one described.

As has been previously described, utilization of methods wherein the heat treating cycle is terminated at a selected time, result in capacitors which have a final capacitance value within 0 to 1.5% of that desired. If exact tolerance requirements are necessary, the heating cycle should be terminated at the time that the capacitance value of a capacitor passes through a point 1.25% below that desired is utilized. In this particular process, the graphs developed for a heat treatment of one additional hour are utilized. Although the capacitors generally pass through the capacitance value 1.25% below that desired at the end of the one hour additional heat treatment at 219° F., errors introduced by variations in tension during the winding of the capacitors may cause the capacitance to pass through this point significantly before or after the end of the additional hour period. By monitoring the capacitance of the capacitor during its production, an automatic termination of the heating cycle may be achieved when the 1.25% value is reached. In general, such termination occurs within 15 minutes before or after the one additional hour period, but in some cases, the termination may occur as far as one and one-half hours beyond the one hour time period.

The present invention relates to a process for producing capacitors having a biaxially oriented, thermoplastic, dielectric medium between alternate electrodes. More particularly, the process disclosed is related to a process for producing capacitors wherein wound layers of biaxially oriented, thermoplastic, dielectric medium such as polystyrene are heat treated to shrink them into an intimate physical bonding relationship with alternate layers of an electrode material thereby to form a capacitor of desired final capacitance. In order to produce a capacitor of such a nature, the process takes into account measurable characteristics of the thermoplastic dielectric web and utilizes the measurable characteristics in ascertaining an initial capacitance value to which the capacitor must be wound in order for the capacitance value to pass through a predetermined percentage of the desired final capacitance value after a major proportion of the shrinking of the dielectric web has occurred. The process disclosed is easily adopted for use with all size ranges of capacitors, and all nominal thicknesses of biaxially oriented, thermoplastic, dielectric mediums. The process disclosed is relatively simple, efficient in operation, economical to utilize and easily adopted to any intended use.

Although the process of this invention relates to a physical process for producing capacitors wherein biaxially oriented, thermoplastic, dielectric mediums are utilized, the single specific example disclosed in the specification is deemed sufficient to teach those skilled in the art both the process and the value of utilizing such a process in making capacitors of such a nature. The process, being based on experimental results, is carried out in precisely the same manner as is described in conjunction with the specific example no matter what biaxially oriented, thermoplastic, dielectric medium is utilized out of the many compositions now known. However, it should be noted that minor adjustments may have to be made in the temperatures utilized in the heat treating cycles as the material utilized for the dielectric medium is altered. Such minor adjustments are within the capabilities of one skilled in the art once they have achieved a basic understanding of the process disclosed herein.

The basic concept underlying the invention as both described above and set forth in the specific example is one which will have many apparent modifications. It is intended that the invention be interpreted as including all of the modifications which fall within the true spirit and teachings thereof.

What is claimed is:

1. A process for producing capacitors wherein wound layers of biaxially oriented, thermoplastic, dielectric material are heated to shrink them into an intimate physical bonding relationship with alternate layers of an electrode material thereby to form an electrically stable capacitor of desired final capacitance value, which comprises the steps of:
  measuring the thickness and the relieving force characteristics of a homogeneous unit of the biaxially oriented material;
  classifying the unit of material according to its two measurements into an individual one of a plurality of classification groups;
  winding alternate layers of the biaxially oriented material and the electrode material to form a capacitor having an initial capacitance value bearing a relationship to the final desired capacitance value predicated upon the individual classification group into which the material falls; and
  subjecting the wound capacitor to heat treatment to effect a substantially complete cure of the dielectric material and a shrinking of the material into an intimate physical bonding relationship with the electrode material, the capacitance of the capacitor reaching a predetermined percentage of the final value desired at the end of the heat treatment such that a subsequent cooling of the capacitor results in the production of an electrically stable capacitor of desired final capacitance value.

2. The process for producing capacitors of a desired final value as defined in claim 1 wherein the biaxially oriented, thermoplastic, dielectric material is polystyrene.

3. A process for producing a polystyrene capacitor wherein wound layers of polystyrene material are heated to shrink them into an intimate physical bonding relationship with alternate layers of an electrode material thereby to form an electrically stable capacitor of desired final capacitance value, which comprises the steps of:
  measuring the thickness and the relieving force characteristics of a homogeneous unit of the polystyrene material;
  classifying the unit of polystyrene material according to its two measurements into an individual one of a plurality of classification groups;
  winding alternate layers of the polystyrene material and the electrode material to form a capacitor with a preselected initial capacitance value bearing a relationship to the desired final capacitance value predicated upon the individual classification group into which the material falls;
  heating the wound capacitor from room temperature to an elevated temperature and at the elevated temperature for a period of time sufficient to effect a major proportion of the shrinking of the polystyrene material into an intimate physical bonding relationship with the electrode material;
  heating the capacitor at the elevated temperature for an additional preselected period of time to effect a substantially complete shrinking and cure of the polystyrene material, the capacitance value of the capacitor substantially reaching a predetermined percentage of the final capacitance value desired at the end of the preselected period of time;
  quenching the capacitor from elevated temperature at the end of the preselected time period to a temperature where the polystyrene material undergoes no further appreciable shrinking which could adversely affect the stability of the capacitor under normal operating conditions thereafter; and
  cooling the capacitor from the quenching temperature to room temperature, the capacitance of the capacitor substantially achieving the final desired value at room temperature.

4. A process for producing a polystyrene capacitor wherein wound layers of polystyrene material are heated to shrink them into an intimate physical bonding relationship with alternate layers of an electrode material thereby to form an electrically stable capacitor of desired final capacitance value, which comprises the steps of:
  measuring the thickness and the relieving force characteristics of a homogeneous unit of the polystyrene material;
  classifying the unit of polystyrene material according to its two measurements into an individual one of a plurality of classification groups;
  winding alternate layers of the polystyrene material and electrode material to form a capacitor with a preselected initial capacitance value bearing a relationship to the desired final capacitance value predicated upon the individual classification group into which the material falls;
  uniformly heating the wound capacitor from room temperature to 219° F. during a two hour period;
  heating the wound capacitor at 219° F. for one hour to effect a major proportion of the shrinking of the polystyrene material into an intimate physical bonding relationship with the electrode material;
  heating the capacitor at 219° F. for an additional preselected period of time to effect a substantially complete shrinking and cure of the polystyrene material, the capacitance value of the capacitor substantially reaching a predetermined percentage of the final capacitance value desired at the end of the preselected period of time;
  quenching the capacitor from 219° F. at the end of the preselected time period to 204° F. where the polystyrene material undergoes no further appreciable shrinking which could adversely affect the stability of the capacitor under normal operating conditions thereafter; and
  cooling the capacitor uniformly from 204° F. to room temperature during a two hour period, the capacitance of the capacitor substantially achieving the final desired value at room temperature.

5. The process for producing polystyrene capacitors of a desired final capacitance value as defined in claim 4 wherein the additional preselected period of heating at 219° F. is one hour.

6. The process for producing polystyrene capacitors of a desired final capacitance value as defined in claim 4 wherein the additional preselected period of heating at 219° F. is two hours.

7. The process for producing polystyrene capacitors of a desired final capacitance value as defined in claim 4 wherein the additional preselected period of heating at 219° F. is three hours.

8. A process for producing a polystyrene capacitor wherein wound layers of polystyrene material are heated to shrink them into an intimate physical bonding relationship with alternate layers of an electrode material thereby to form an electrically stable capacitor of desired final capacitance value, which comprises the steps of:
  measuring the thickness and the relieving force characteristics of a homogeneous unit of the polystyrene material;
  classifying the unit of polystyrene material according to its two measurements into an individual one of a plurality of classification groups;
  winding alternate layers of the polystyrene material and the electrode material to form a capacitor with a preselected initial capacitance value bearing a relationship to the desired final capacitance value predicated upon the individual classification group into which the material falls;
  heating the wound capacitor from room temperature to an elevated temperature and at the elevated temperature for a period of time sufficient to effect a major proportion of the shrinking of the polystyrene material into an intimate physical bonding relationship with the electrode material;
  heating the capacitor an additional period of time at a temperature sufficient to effect a substantially complete shrinking and cure of the polystyrene material, the termination of the additional period of time being based upon the capacitance value of the capacitor reaching a predetermined percentage of the final capacitance value desired;

monitoring the capacitance value of the capacitor during the additional period of heat treatment and upon the capacitance reaching the predetermined percentage of the final capacitance value desired, terminating the additional period of heat treatment and quenching the capacitor from the elevated temperature to a temperature where the polystyrene material undergoes no further appreciable shrinking which could adversely affect the stability of the capacitor under normal operating conditions thereafter; and cooling the capacitor from the quenching temperature to room temperature, the capacitance of the capacitor achieving the final desired value at room temperature.

9. A process for producing a polystyrene capacitor wherein wound layers of polystyrene material are heated to shrink them into an intimate physical bonding relationship with alternate layers of an electrode material thereby to form an electrically stable capacitor of desired final capacitance value, which comprises the steps of:

measuring the thickness and the relieving force characteristics of a homogeneous unit of the polystyrene material;

classifying the unit of polystyrene material according to its two measurements into an individual one of a plurality of classification groups;

winding alternate layers of the polystyrene material and the electrode material to form a capacitor with a preselected initial capacitance value bearing a relationship to the desired final capacitance value predicated upon the individual classification group into which the material falls;

uniformly heating the wound capacitor from room temperature to 219° F. during a two hour period;

heating the wound capacitor at 219° F. for one hour to effect a major proportion of the shrinking of the polystyrene material into an intimate physical bonding relationship with the electrode material;

heating the capacitor an additional period of time to effect a substantially complete shrinking and cure of the polystyrene material, the termination of the additional period of time being based upon the capacitance value of the capacitor reaching a value 1.25% below the final capacitance value desired;

monitoring the capacitance value of the capacitor during the additional period of heat treatment and upon the capacitance reaching the value 1.25% below the final capacitance value desired, terminating the additional period of heat treatment and quenching the capacitor from 219° F. to 204° F., where the polystyrene material undergoes no further appreciable shrinking which could adversely affect the stability of the capacitor under normal operating conditions thereafter; and cooling the capacitor uniformly from 204° F. to room temperature during a two hour period, the capacitance of the capacitor increasing to final desired value at room temperature.

References Cited
UNITED STATES PATENTS

| | | | |
|---|---|---|---|
| 2,887,634 | 5/1959 | Peck et al. | 317—258 |
| 3,160,801 | 12/1964 | Haas et al. | 156—85 X |
| 3,221,227 | 11/1965 | Devaney | 156—85 |

EARL M. BERGERT, *Primary Examiner.*

PHILIP DIER, *Examiner.*